United States Patent [19]

Frias et al.

[11] Patent Number: 4,494,859
[45] Date of Patent: Jan. 22, 1985

[54] MODULAR READER/PRINTER DEVELOPER APPARATUS

[75] Inventors: Ronald J. Frias, Milwaukee; David Jagielski, Kewaskum; Nicholas R. Schetter, Rubicon, all of Wis.

[73] Assignee: Micron Corporation, Iron Ridge, Wis.

[21] Appl. No.: 482,524

[22] Filed: Apr. 6, 1983

[51] Int. Cl.³ .................... G03G 15/00; G03G 15/26
[52] U.S. Cl. .............................. 355/5; 355/11; 355/45
[58] Field of Search ............ 355/5, 11, 3 R, 10, 355/14 R, 3 CH, 14 CH, 44, 45, 60; 354/152, 224, 225

[56] References Cited

U.S. PATENT DOCUMENTS

| | | | |
|---|---|---|---|
| 3,877,805 | 4/1975 | Heldenbrand et al. | 355/5 X |
| 3,951,543 | 4/1976 | Mulligan | 355/5 X |
| 3,986,771 | 10/1976 | Tsukada | 355/3 R |
| 4,113,377 | 9/1978 | Sone et al. | 355/45 |
| 4,278,346 | 7/1981 | Toriumi et al. | 355/45 |

Primary Examiner—A. C. Prescott
Attorney, Agent, or Firm—Andrus, Sceales, Starke & Sawall

[57] ABSTRACT

A reader/printer apparatus includes a main frame having an optical system for exposure of photocopy paper with the image on a film carrier in combination with an integrated modular developing station which is adapted to receive any one of a plurality of different developer modules. Each module is a self-contained plug-in type structure and includes a dry silver paper developer module and an electrostatic developer module are provided. Each module includes an infeed unit and a discharge unit for passing the paper from the exposure unit through the developer module. The dry silver module includes a suitable transfer roll and mating heating bars for developing the exposed dry silver paper. The electrostatic module includes a magnetic toner brush assembly to deposit toner particles in the image area. Each module includes an essentially identical rectangular frame structure corresponding to a rectangular developer chamber having a suitable guide means. Either of the modules is directly mounted into the developer chamber, with the infeed unit aligned with the discharge unit from the exposure station and a discharge unit aligned with an exit opening. A corona charging module is releasably mounted in the reader/printer immediately upstream of the entrance into the exposure station or unit. This module charges the photoconductive paper for electrostatic printing prior to entrance into the exposure station. The charging module is replaced with a transfer guide for dry silver printing. The charging may be negative or positive. A power supply switch includes a dead band area in switching from one polarity to the other and includes a pair of electromagnetic vacuum enclosed reed switches connecting the high voltage to the corona charging wires.

23 Claims, 12 Drawing Figures

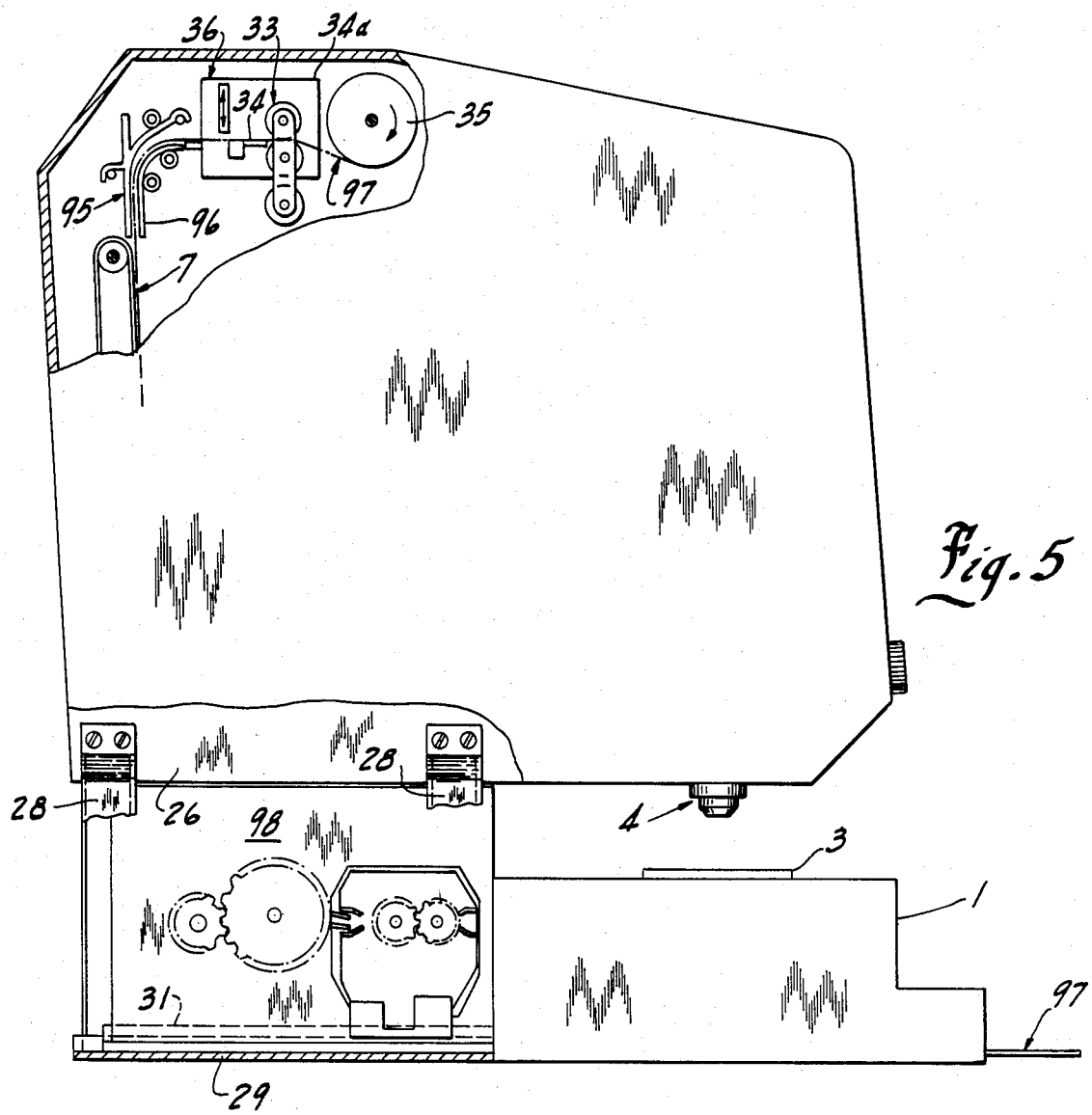

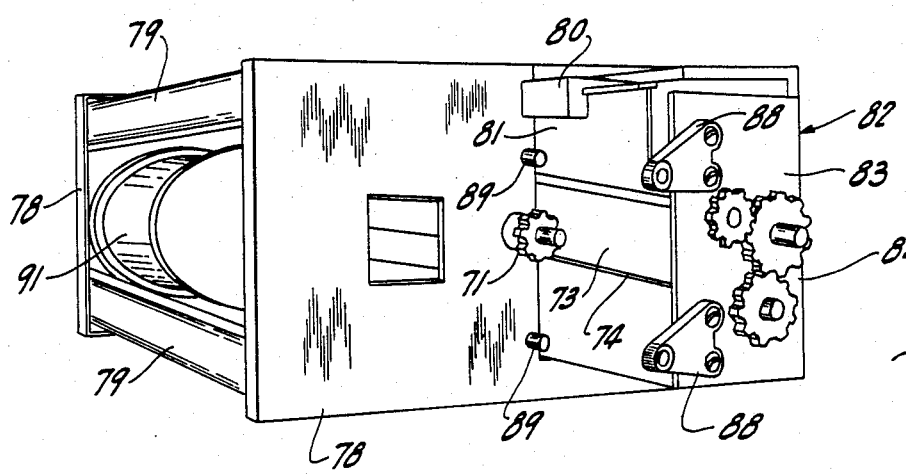
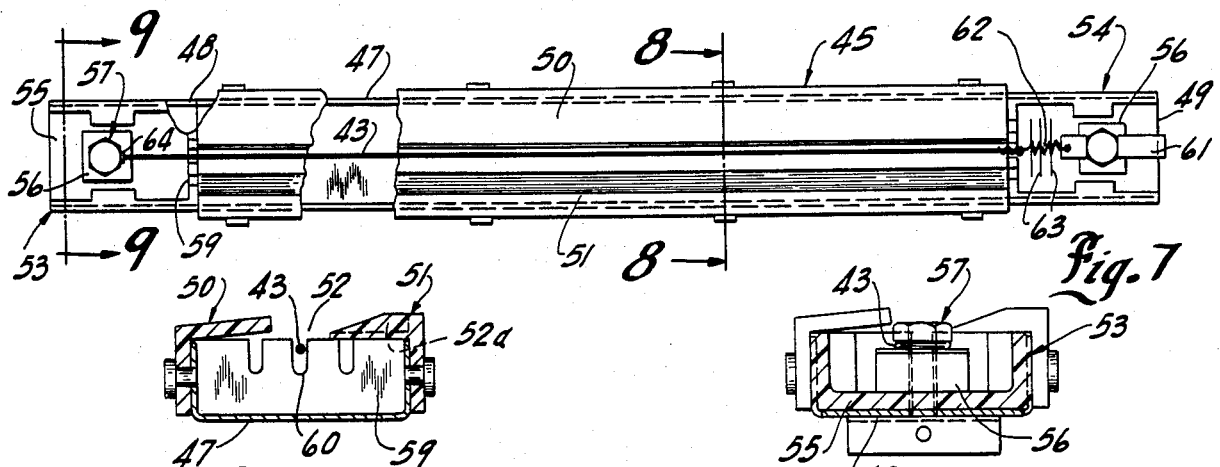
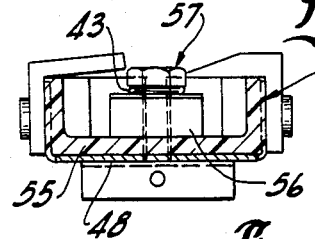
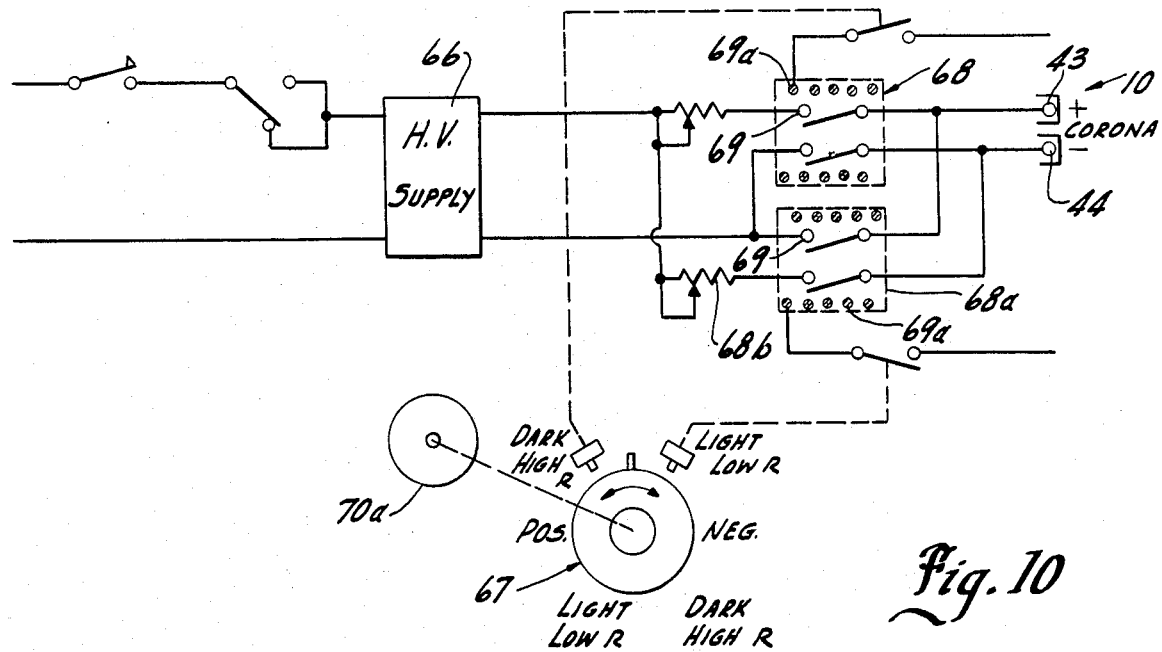

MODULAR READER/PRINTER DEVELOPER APPARATUS

BACKGROUND OF THE PRESENT INVENTION

The present invention relates to a multiple reader/printer developer apparatus and particularly to such apparatus to display the image of a film and selectively copy said image.

The recent development of film storage systems has resulted in a demand for combined printer/reader to retrieve the information in the storage film. Various systems have been developed. A particularly satisfactory dry silver paper developer and process is disclosed in U.S. Pat. No. 4,322,158 which issued Sept. 8, 1981. The above patent discloses a reader/printer apparatus having means for introducing a storage film negative on which the information is carried. An optical system provides for projection of an enlarged image onto a display screen. The apparatus further includes a printing unit which permits printing of the displayed information. The printing unit includes a thermal developer having a uniquely heated roller and heating bar for guiding and developing the imaged copy paper through the developer. Other types of developing systems are used and available in the art. For example, electrostatic developers have been used in which a photoconductive copy paper is exposed to form a latent image from a positive or negative carrier and then developed. Various systems have been suggested, such as shown in U.S. Pat. Nos. 4,166,691 issued Sept. 4, 1979; 4,155,330 issued May 22, 1979, and 4,288,519 issued Sept. 8, 1981. A direct reversal development apparatus is also disclosed in the copending application of Ronald Frias entitled "Single Step Reversal Electrostatic Developing Method and Apparatus" which was filed on even date herewith and which is assigned to a common assignee herewith. The latter application discloses a means for exposing the negative image on an appropriately photoconductive coated paper and passing the exposed paper through a magnetic toner brush developer for directly depositing of the toner particles directly onto the exposed neutral areas of the exposed paper. This of course provides a single step direct reversal development of the negative. The various users may of course prefer one developer or the other. The electrostatic process for example is somewhat less costly when compared to the dry silver paper process. A high volume user may therefore prefer to use the electrostatic process. However, the electrostatic developer requires the use of a toner, and the addition and removal of the toner particles supply. The machine is also subject to the possibility of the toner particles entering the mechanism. The user may therefore prefer a dry silver process wherein the total development chemistry is incorporated directly into the copy paper and development only requires appropriate heating of the paper to generate the image and form the hard copy.

Generally, completely separate reader/printer apparatus have been developed and marketed for each type of development process.

In the toner system developing process, the photocopy paper includes a photoconductive layer which is charged generally through a corona charging apparatus, to a high electrical charge level which may be either a positive charge or a negative charge. Such high voltage structure is not required in the dry silver process. The charged copy paper in the electrostatic process is then passed through an optical system and exposed to the positive or negative image. During the exposure, the transmitted light, which defines the image, effectively neutralizes the charge in the photoconductive layer, resulting in creation of the latent image in the charged layer.

The corona charging device is a high voltage device and the characteristic of the print is of course directly related to the effectiveness of the charging. Further, the corona charging device generally uses a thin, delicate wire for appropriate charging. This may require replacement and and of course a simple, construction is desired to permit reliable and convenient servicing by the user or service personnel.

The devices are generally distinctly constructed for the particular development process and various acceptable reader/printers are available. Such production of completely separate systems necessarily results in a high inventory cost as well increase in the cost of the machines.

There is a need for a reader/printer apparatus which can be readily constructed with either one of a number of different types of developing apparatus having a common basic main frame and particularly such apparatus which permits construction as a magnetic toner brush developer with a corona charging unit or a dry silver thermal paper developer without significant and expensive modification to the basic main frame.

SUMMARY OF THE PRESENT INVENTION

The present invention is particularly directed to a reader/printer apparatus having a main frame unit within which an optical system is provided for reading a film element such as a film strip, a microfiche or the like film carrier and for exposure of photocopy paper with the image on the film carrier in combination with an integrated modular developing station which contains a removable developer module. The module is a suitable, self-contained plug-in type structure, and the reader/printer apparatus is adapted to receive any one of a plurality of different developer modules. In a preferred embodiment, the main frame unit is constructed to receive a dry silver paper developer module or a magnetic toner brush developer module.

Generally, the reader/printer apparatus includes an optical system having a mirror system which in one position reads and displays the image on a screen and in the alternate second position exposes the copy paper. A paper feeder is associated with the optical exposure unit unit and is adapted to automatically transfer the photocopy paper through the exposure unit to a paper discharge unit located in closed coupled relation to the developer module chamber.

Each developer module is generally a substantially separate self-contained unit including feed or transfer means for transferring of the exposed copy paper from the exposure station or unit through the developer module and discharging of the copy paper to the exit unit in the reader/printer apparatus.

The dry silver developer module includes a suitable transfer roll and mating heating bars for developing the exposed dry silver paper as it passes through a thermal developer, and is then discharged. Similarly, the magnetic toner brush developer module includes a paper moving system transferring the paper through the module, which also includes a magnetic toner brush, and discharging of the imaged paper from the module into the discharge or exit unit of the reader/printer apparatus. Each module includes an essentially identical supporting frame structure, such as a rectangular frame structure. The reader/printer includes a generally rectangular developer chamber having a suitable guide means. Either of the modules is directly mounted into the developer chamber, with an infeed means and a discharge means aligned with the discharge means from the exposure station and the module discharge means aligned with the exit means of the reader/printer.

In addition, the magnetic toner brush developer requires a high voltage corona charge unit to charge the photoconductor. In this aspect of the invention, a corona charge module is releasably mounted in the reader/printer immediately upstream of the entrance into the exposure station or unit. The corona charge module is releasably mounted and charges the photoconductive paper prior to entrance into the exposure station. A corona charge device particularly developed for use in the modular reader/printer includes a pair of symmetrical corona wire support units interconnected to form an elongated unit spanning the entrance to the exposure station. The unit is releasably mounted in the reader/printer in a simple supporting bracket at the opposite ends of the corona device. Each support unit includes a single elongated wire stretched between the opposite ends of the corona unit and connected at one end to a high voltage supply. The wires are spring-loaded. If for any reason, the wire is disrupted or damaged, the wire is replaced and properly tensioned by stretching the wire to a graduated scale provided within the one end of the unit.

The generally elongated rectangular corona unit is releasably mounted for simple introduction when the magnetic toner brush module is used; and for removal from the reader/printer when the dry silver module is used. A guide system replaces the corona unit in the dry silver process.

In connection with a magnetic toner brush developing system, it is often desirable to use a bi-mode type of paper, wherein the paper can be charged positively for one process and alternately negatively for the opposite process. Care must of course be taken in connecting of the corona charging module to the power supply not only to obtain proper charging but to prevent arcing within the unit during switching, which operates at voltages in excess of 10,000 volts. A switching control preferably includes a dead band area in switching from one polarity to the opposite. A unique control and circuit includes a pair of dual reed switches which include sealed reed switches which operate in a vacuum enclosure. The reed switches connect the high voltage to the corona charging wires. The deadband in the control unit ensures that there is zero voltage on the corona charging device and the reed relays during the switching sequence and that the voltage is only applied after a complete de-energized state. The switching control may advantageously further include an exposure level control for the optical system.

The modular construction permits the construction and development of a single basic reader/printer with a common plug-in developing main frame. Each module is not only conveniently manufactured but is of course readily manufactured and assembled to the basic main frame. The module can also be removed as a unit for servicing.

Thus, the present invention provides an improved reader/printer apparatus with a modular developer construction and further includes an improved modular corona charging unit for electrostatic printing system. The present invention particularly provides an improved reader/printer apparatus uniquely and particularly adapted to multiple developer systems and particularly adapted to selective use of a magnetic tone brush unit developer module or a dry silver developer module.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIGS. 5 and 5a are views illustrating the apparatus with a drive silver developer;

FIG. 6 is a pictorial view of the toner brush developer.

FIG. 7 is a plan view of a corona charging device for use in the embodiment of FIGS. 1–4;

FIG. 8 is a vertical cross-section through the corona charged device shown in FIG. 7;

FIG. 9 is an exploded view of the two parts of the corona charging device shown in FIGS. 6 and 7; and FIG. 10 is a schematic of the corona charging supply circuit.

DESCRIPTION OF THE ILLUSTRATED EMBODIMENT

Figures 1, 2:
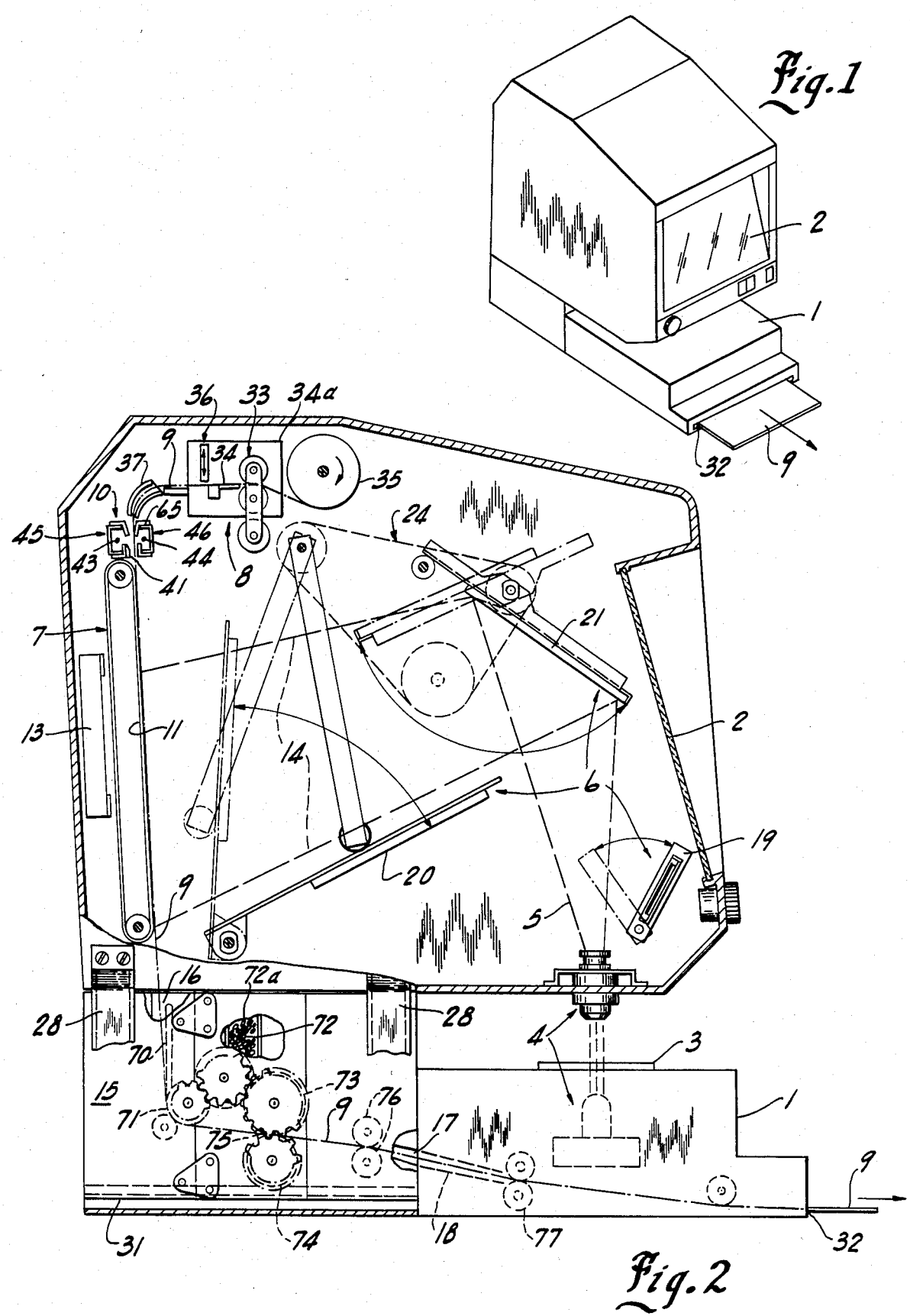
FIG. 1 is a pictorial view of a reader/printer unit constructed in accordance with the present invention.
FIG. 2 is a side view of the apparatus shown in FIG. 1 with parts broken away and sectioned to show detail of construction.
Figure 3:
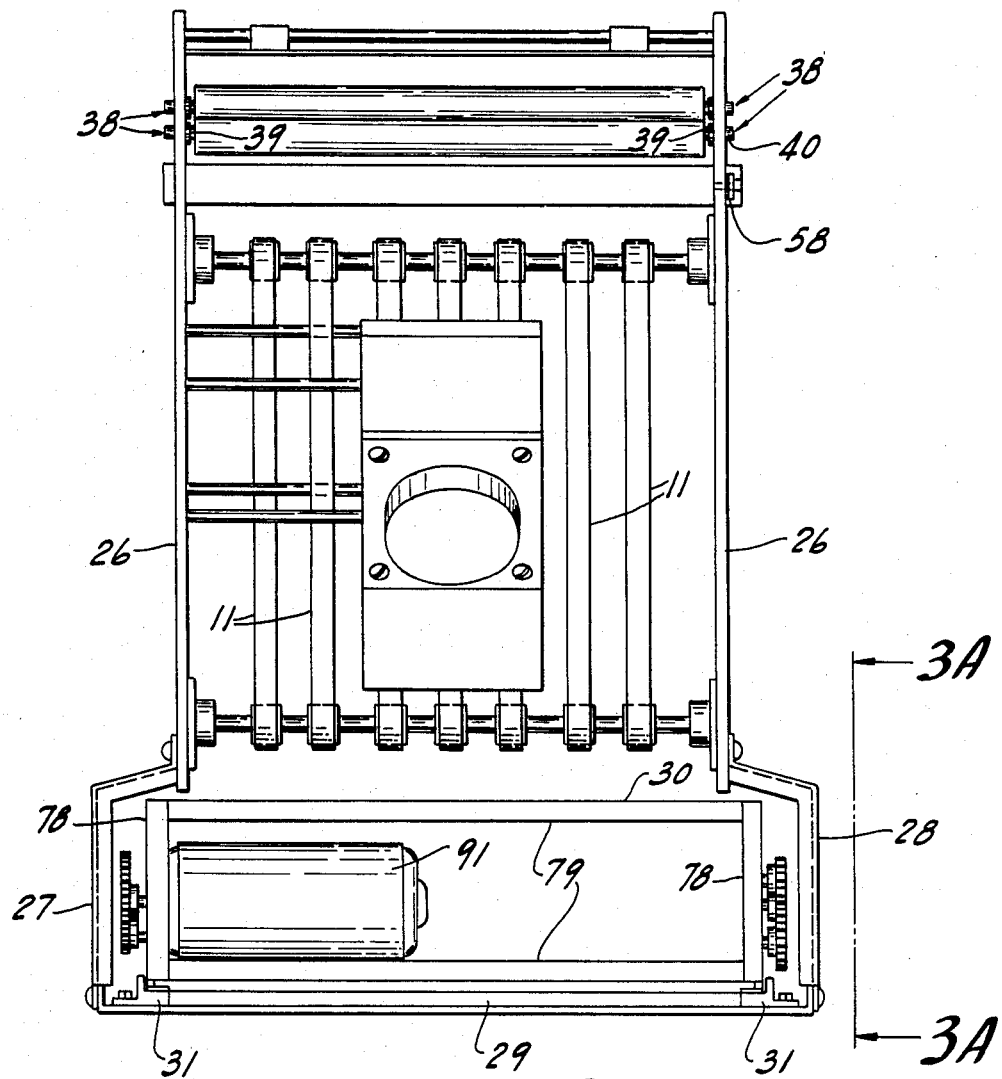
FIG. 3 is a back view of the apparatus shown in FIG. 1.
Figure 3A:
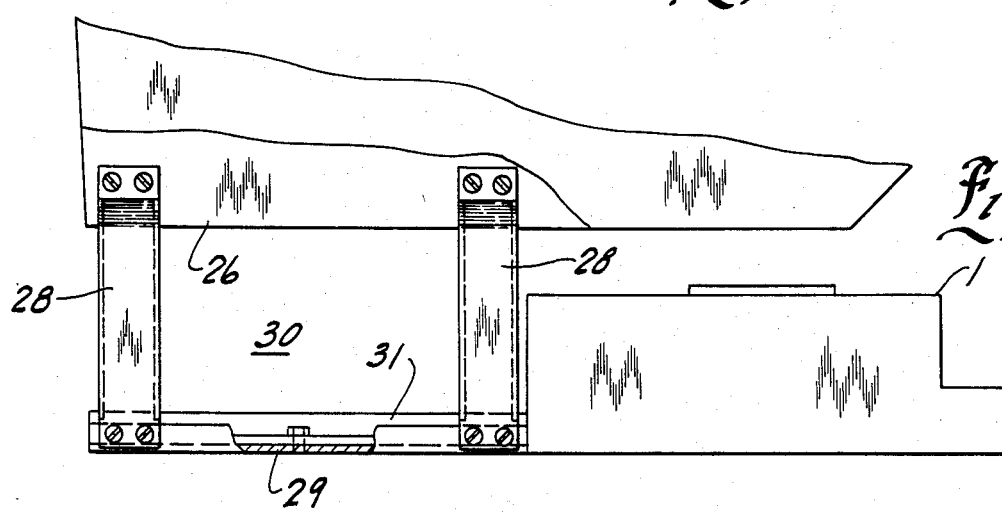
FIG. 3a is a fragmentary lower side view illustrating a module receiving chamber.
Figure 4:
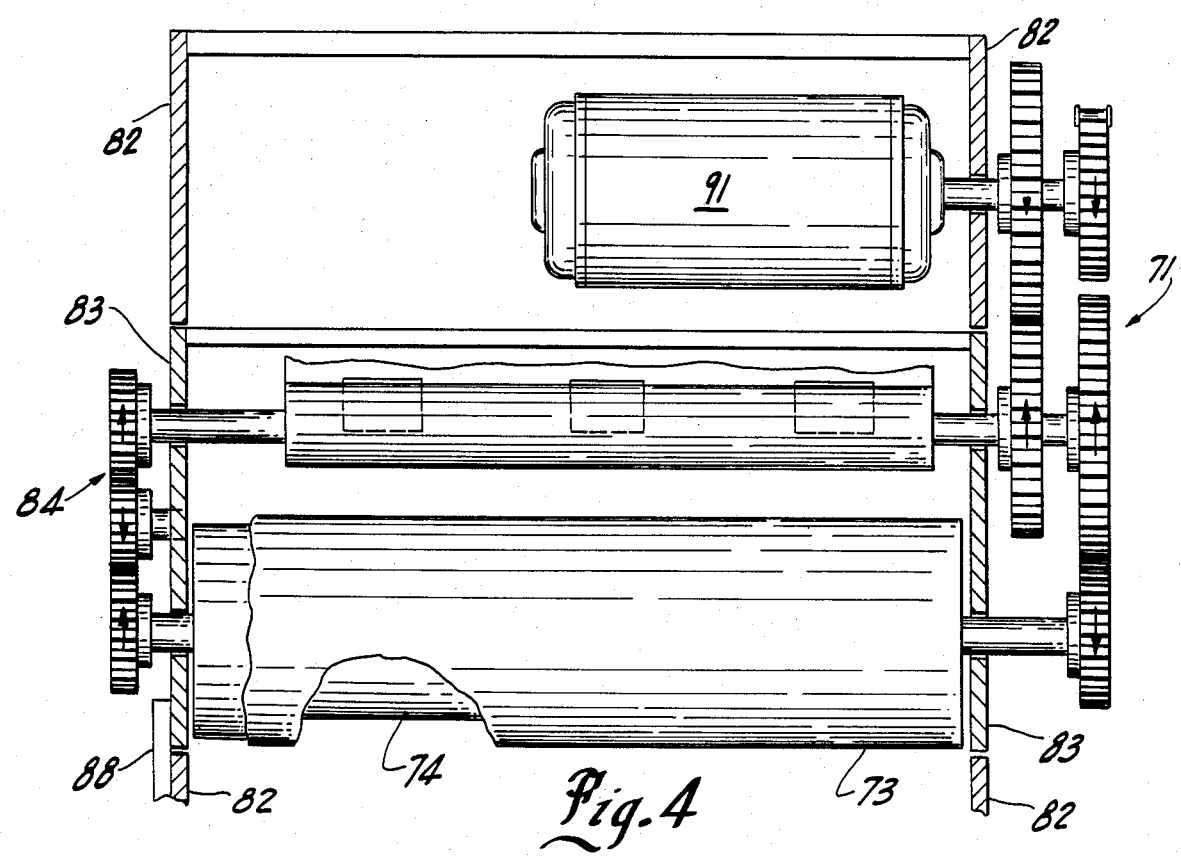
FIG. 4 is a partial cross-sectional view of the apparatus shown in FIGS. 1 and 2, illustrating the apparatus for a magnetic toner brush developing.

Referring to the drawings and particularly to FIGS. 1–3, a reader/printer apparatus is shown having a film carrier unit 1 secured to the front bottom portion of the reader/printer apparatus and a front viewing screen 2 located immediately above a storage film member 3. An optical system 4 projects the image 5 upwardly into the upper portion of apparatus behind the reading screen 2 and into engagement with an internal mirror system 6 for transmitting of the image onto the screen 2 or alternatively to the rear of the reader/printer apparatus. The back portion contains a photo-exposure unit 7, generally aligned with the front viewing screen. A copy paper feed unit 8 is located to the upper back portion of the reader/printer and is adapted to store and cut a blank photoconductive copy sheet or paper 9. A special corona charging module 10 is locatd between the feed unit 8 and the exposure unit 7. The charging unit 10 charges the photoconductive copy sheet with a uniform D.C. charge. The exposure unit 7 is generally similar to that disclosed in the U.S. Pat. No. 4,322,158 and includes appropriate conveyor belts 11 defining a planar support for the copy sheet 9. The conveyor belts 11 are angularly oriented to hold the paper 9 for exposure to the light transmitted image. A fan-vacuum unit 13 holds the copy paper 9 in position in alignment with the transmitted image 14. The exposing of the copy paper 9 creates a latent image which is developed within a developer module 15 located to the lower back portion of the reader/printer. The developer module 15 is specially constructed as a self-contained assembly, with its own feed means to receive the exposed copy paper at an inlet opening 16, pass the paper through a development stage and discharge the developed paper from an opening 17 and from the reader/printer through a discharge chute 18 in the lower front portion of the reader/printer to the user, thereby providing a hard copy of the information on the film.

The film member 3 is of any suitable construction, and may be a microfiche, a part of a film roll or the adapted to aligned with the optical system for selective transmission of the information. The particular method of aligning the image is not significant to the present invention and no further descirption thereof is given.

Similarly, the optical mirror system 6 can be of any suitable construction such as shown in U.S. Pat. No. 4,322,158. In the illustrated embodiment of the invention, a small pivotally mounted mirror 19 for receiving of the image and redirecting of the image to a large directional mirror 20 for transmission of the image to the front screen. A separate printing mirror 21 is mounted within the upper portion of the apparatus and is adapted to be pivoted to a position overlying the incoming image for direction onto the exposure belts. The mirror unit 20 is rotatably mounted and connected to a gear driven unit 24 for selective positioning between the reading position shown, and a storage position shown in phantom. The mirror 21 is coupled to the gear driven unit 24 and is similarly moved from a storage position downwardly to a print position. The small mirror 19 is also pivotally mounted and pivoted from the path of the upwardly directed image with the movement of the large printing mirror 20 to the exposing position. If the paper jams, the user can readily remove the front viewing screen, reach through the opening to remove the paper from the exposure unit with the unit place in the display position.

The present invention is particularly directed to the modular construction for the developer modules 15 and the related modular components such as the corona charging module. The several modules 15 are self-contained and releasably mounted units. In the illustrated embodiment the plug-in developer modules is generally rectangular box-like structures within which the paper feed and developing devices are mounted, as more fully developed hereinafter. All modules include the copy paper receiving opening 16 in the upper wall of the module frame work in alignment with the transfer conveyor of the exposure unit 7, and a discharge opening 17 in the front or forward wall of the framework. Thus, the reader/printer apparatus includes a frame structure basically including side plates 26 interconnected to each other to form a substantial support for the several components.

In the illustrated embodiment of the invention, the side frame structure includes depending offset structural legs 27 and 28 creating a lower cutout portion of the opposite side plates 26. A bottom plate 29 is secured to the lower ends of the legs 27-28 and define a simple rectangular developer module chamber 30 immediately beneath and aligned with the discharge end of the exposure conveyor belts 11, which are aligned generally with the central portion of the chamber 30.

L-shaped tracks 31 are secured to the bottom wall 29 and define guide members within which the developer module 15 is slidably mounted within the developer chamber 30.

The developer module 15 is a generally rectangular module having an outer supporting frame work and substantially conforms to chamber 30. In the assembled relation, the developer module 15 is bolted or otherwise firmly locked in position with the paper inlet aligned with the discharge path from the exposure conveyor belts 11. The developer module 15 further includes the discharge opening 17 aligned with the discharge chute 18 in the lower front portion of the reader/printer apparatus. The paper discharge chute 18 is shown as a converging closed channel member for discharging the developed paper 9 through an appropriate opening 32 in the front lower section of the reader/printer apparatus.

The paper supply unit 8 includes a feed roll unit 33 secured within the upper portion of the reader/printer frame 26. The feed roll unit 33 consists of a pair of driven pinch rolls and a guide plate 34 for moving the copy paper from a storage roll 35 into a cutter 36. The cutter mechanism includes a mounting plate 34a which mounted by mounting bolts for electrically isolating the cutter mechanism. The cut paper is moved into the transfer channel 37.

The transfer channels 37 are curved members which span the entrance of the corona discharge module 10. The entrance passageway of the channel 37 is aligned with the discharge end of the cutter mechanism and curves to a discharge opening having a depth slightly greater than the photoconductive paper 9. The transfer channel is releasably clamped within the side plates 26 by a plurality of clamping bolt units 38. Each bolt unit 38 includes a shouldered washer 39 located on securement bolts 40 which thread into the side plate 26 of the reader/printer frame. The shoulders on the washer 39 engage the edge of the channel 37 and frictionally clamp the transfer channel in place. The washers 39 are formed of a suitable high voltage insulating material and again electrically isolate the transfer channel 37 to minimize creation of any adverse electrical charges on the photoconductive paper 9.

The photoconductive paper 9 is then passed through a central passageway 41 in the corona charging module 10, wherein the photoconductive layer 42 of the paper 9 is uniformily charged to a high D.C. voltage level, generally on the order of 100 to 200 volts D.C. The corona module 10 is a substantially symmetrical device to the opposite sides of the paper gap or passageway 41. In the illustrated embodiment of the invention, a first and second aligned charging wires 43 and 44 are located to the opposite sides of the paper passageway 41.

The illustrated corona module 10 includes a pair of housing or support units 45 and 46 of a similar construction and using basically similar components.

Referring to support unit 45 a C-shaped metal 47 includes end extension 48 and 49. A first insulating L-shaped rail 50 is secured to the infeed side or upper leg of the channel 47 in the drawing and the opposite or a second L-shaped rail 51 is secured to the lower or opposite discharge side leg and extends over the opening of the channel to define a restricted opening 52 aligned with the corona wire 43. Each L-shaped rail 50-51 is molded or otherwise formed of a suitable high voltage insulating plastic, such as nylon or glass filled A.B.S. The rail at the entrance to the corona module has its depending leg tapered or inclined toward the path of the copy paper 8. The discharge rail 51 has its second leg spaced more outwardly of the paper path. A plurality of laterally spaced and inclined flanges 52 are formed on the leg and base and define an inclined guide surface extending laterally and terminating in close spaced relation to the paper passageway.

The L-shaped rails 50-51 are similarly suitably affixed to the side of metal channel 47 as by plastic rivets or the like. The metal channel 47 includes end plates 48-49 extending integrally from the opposite ends. Similar terminal end caps 53 and 54 are secured to the plates 48-49. Each end cap 53-54 is shown as a molded plastic unit including a base 55 secured to the extension and having internal terminal block 56 centrally located thereon. At the one end, a grounding bolt and washer unit 57 fixes the one end of the corona wire 43 firmly to the outer face of the terminal block 56. The bolt and washer unit 57 extends through and is in contact with the base extension 48 to provide interconnection of the corona wire 43 to the channel 47. A ground tab 58 on the channel is bolted or otherwise secured to side wall plate 26 of the reader/printer frame and provides a grounded connection. The end cap 53 includes generally U-shaped encirclement wall about the terminal connection including a wire guide wall 59 abutting and closing the ends of the channel side walls. The end cap 53 is closed by a suitable insulating cover in the assembled position. The wire guide wall 59 is slotted and includes a central slot 60 which defines a guide opening and edge for centrally locating the corona wire 43 within the corona module.

The opposite end of the channel 47 is provided with the end cap 54 with the same terminal block and U-shaped wall. A high voltage connector 61 is bolted to the terminal block only and is electrically isolated from the metal channel 47. The connector 61 is a strip-like member which extends to the opposite sides of the terminal block within the U-shaped wall. The outer end of the connector 61 provides for a spade-type quick connect to a high voltage lead, not shown. The opposite end of the connector 61 is connected to the end of the corona wire 43 by a tension spring 62.

In usage, the fragile corona wire 43 may be subject to disruption or other adverse effects. As most clearly shown in FIG. 7, end cap 54 is provided with a plurality of longitudinally spaced marks 63 and the corona wire 43 related to its length. The wire is pulled taut until a particular tension mark 63 is aligned with the end of the spring 62. The clamping bolt unit 57 is then tightened to securely lock the corona wire 43 in position. The user is of course instructed as to the necessary mark alignment.

As more fully developed hereinafter, the corona voltage to be applied varies depending upon the particular type of photoconductive exposure and the like. Thus, on a positive charged paper, the impressed voltage may be 14 Kv D.C. voltage. For negative charging of the photoconductive paper, a 10 Kv D.C. voltage may be adequate. Thus, negative charging may use a one and one half mil wire while the higher charging voltage may use three mil wire. Thus, as shown in FIG. 2, the wire would be three mil in diameter and the negative wire 44 would be one and one half mil in diameter. This wire extend the life of the wires, particularly wyhen operating at the higher voltage.

The opposite support section or unit 46 is essentially identically constructed to that of unit 45 with the exception that the upper L-shaped rail is formed with its depending leg 65 angulated at a somewhat greater angle towar the paper path and in fact defining the edge of the paper passageway. Thus, in the assembled relation of the two support units 45 and 46 the entrance of the passageway 41 is offset slightly with respect to the path of the paper and guides the paper into the gap defined by the lower rail legs. Thus, the paper may have a tendancy to curl and it is important to align the paper with the entrance to the exposure unit for exposure of the uniformily charged paper and transfer into the developer module 15.

The wires 43 and 44 are connected to a high voltage supply 66, shown in the schematic of FIG. 10. The developer, as hereinafter described, provides for direct and reverse development, such as discussed in the co-pending application filed herewith. The polarity to which the copy paper 9 is charged is opposite for the two different developments. In the illustrated embodiment, the paper 9 is selectively charged with a negative charge or a positive charge. A selection switch unit 67 is connected to control energization of a pair of identical dual-contact reed switches 68 and 68a connecting the power supply 66 to the wires 43 and 44 in series with a high voltage variable resistor 68b. Thus, each reed switch 68 and 68a includes sets of contacts 69 and an operating coil 69a. The contacts 69 of switch 68 connect the power supply 66 to wires 43-44 with one polarity and the contacts 69 of switch 68a establishes an opposite polarity connection, as shown. The contacts 69 of each relay operate in a vacuum sealed chamber and are controlled by selective energization of the coil 69a. The switch 67 is shown as a rotating switch operable to connect the coils 69a to a control power lead in response to opposite rotation from an "off" position, at which the switch may be releasably held as by a detent.

The rotary switch control 67 may be a simple wafer switch which is constructed with a deadband to the opposite sides of the "off" position, which may encompass a total angular displacement of thirty degrees. Thus, clockwise rotation of fifteen degrees is required to provide a power connection to energize the relay coil 69a of relay 68 and a similar counterclockwise rotation is required to energize the coil 69a of the relay 68a. The deadband is desirable to apply high voltage to the reed switches only when the system is in operation. The reed switch which operates in a vacuum provides a smaller, compact but reliable and long life switching means for switching of the high voltage power supply, which may be as high as 16000 volts D.C. or more.

Integrated into the selector switch unit 67 is a light intensity control 70a for the optical system. Thus, the particular developing process determines the intensity of the exposure light desired. The control 70a may be a simple potentiometer unit coupled to be rotated with the control to simultaneously set the exposure level after energizing of the corona module 10.

As previously discussed, the reader/printer apparatus may be constructed to process any one of various forms of copy paper and therefore require different forms of develope modules 15.

In FIGS. 1-5, the apparatus is particularly adapted for use of magnetic toner brush developer module 15 and a photoconductive paper 9. Alternatively, the reader/printer apparatus can be directly applied by simple replacement of the developer module 15 and removal of the corona module 10 to thermally develop a dry silver paper, as shown in FIG. 6.

Referring to FIGS. 1-5, the developer module 15 may be advantageously constructed as more fully disclosed and described in the copending application filed on even date herewith. The module 15 includes an infeed assembly or chute 70 having a pair of pinch rollers 71 at the lower end for redirecting of the exposed photocopy paper into a magnetic toner brush module 15 for direct reversal developing of the exposed image. As more fully disclosed in the above application, a generally isolated source such as a bin 72 of toner particles 72a supplies the particles to an electrically isolated magnetic brush unit 73. An electrically isolated roller 74 is mounted in precise spaced relation to define a developing gap 75 somewhat greater than the thickness of the photocopy paper. In a reverse development process, as the exposed paper 9 passes through the gap 75, the magnetic toner particles of the brush unit 73 transfer to the essentially neutral voltage areas, while being repelled from high charge areas. This of course provides for direct development of the reverse image of the negative and thus provides a positive of the negative image. A positive development process can also be provided by proper charging of the paper. A pair of fixing rolls 76 are secured downstream of the magnetic toner brush unit 73 within the developer module and discharge the imaged paper 9 from the module 15 into the discharge chute.

A pair of pinch rolls 77 are shown mounted at an intermediate location of the chute 18, and are similarly continuously driven to propell and discharge the imaged paper from reader/printer apparatus.

Figure 5A:
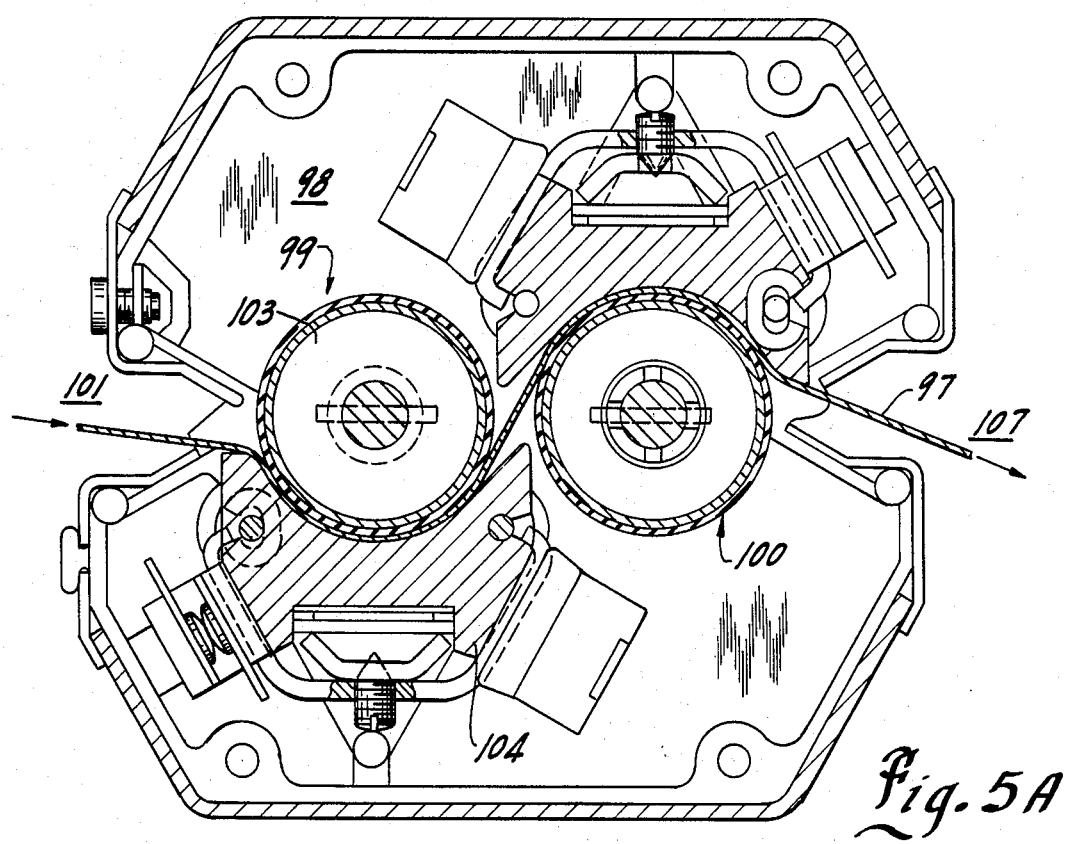

The photoconductive developer module 15 includes a rectangular frame structure corresponding to the configuration of the developer chamber 30 in the reader/printer frame. As noted in the copending application, the magnetic toner brush unit is preferably electrically isolated, while maintaining stable support of the assembly. In the illustrated embodiment of the invention, the module includes a pair of rigid side wall plates 78 interconnected by cross members 79 to form a rigid supporting module frame. A cross-track 80 is secured to the side walls of the developer module and spans the frame. The cross-track 80 is formed of a suitable electrically insulating material and is of a generally inverted U-shaped configuration. The depending walls or sides of the track 80 are slotted to receive the opposite edges of a support plate member 81 of a toner brush subassembly 82, as shown in FIG. 5. The subassembly 82 of the developer components is formed and secured to the support members 81. The subassembly is a rectangular unit having end plates 83. The toner particle bin 72 is secured to the end plates 83 and has a bottom opening aligned with a magnetic brush 73 rotatably mounted in the end plates. The backing roller 74 has an outer insulating cover and is rotatably mounted in the end plates 83 in spaced relation to the brush unit to define the developing gap therebetween. The brush and roller 74 are coupled to the driver feed rollers 71 as by a gear train 84. The subassembly 82 is adapted to be slidably mounted in and suspended from the inverted U-shaped track 80. The subassembly 82 is stabilized and rigidly fixed within the module by upper and lower end supports 88 on the one side frame plate. Each support 88 is formed of an electrically insulating member which is bolted or otherwise rigidly affixed to the side plate 83 and projects laterally therefrom across the frame plate 78. The end of the support 88 is apertured and adapted to mate with a supporting pin 89 on the frame plate 78 of the module 15. Thus, in the assembled relation, the support 88 mates with the pin 89 to form a firm and rigid support of the magnetic toner brush subassembly 82 as a part of the developer module 15, while maintaining electrical isolation of the several components. The feed roller 84 are secured to the side plates of the module 15 adjacent to the plug-in brush subassembly 82.

The feed rollers 86 are located adjacent a paper receiving chute 90 and are coupled by a gear train 91 to a motor secured to the frame plate 78 within the outer portion of the module. The feed rollers 86 serve to transfer the exposed copy paper 9 through the developer subassembly 82 and into a pair of fixing rollers 93, which are coupled to the gear train by a chain drive. The roller 93 fixes the image and discharges the copy paper into the discharge chute 18 for delivery of the completed copy to the user.

In summary, the user may view the film image on the screen 2 and/or obtain a print of such image. The print cycle provides for the direct passage of the copy paper 9 through the charging module 10, the exposure unit 9 and then through the developer module 15 to the discharge chute 18.

As previously discussed, the user may prefer some process other than the charged paper, electrostatic developing process. The present invention is adapted to permit providing of the user with the desired development means by providing the necessary developer module 15 within the plug-in module chamber of the main frame. For example, a dry-silver paper developing system, such as disclosed in U.S. Pat. No. 4,322,158 is shown in FIG. 6 applied to the main frame.

In the alternate embodiment, the corona module 10 is removed from its support and as shown in FIG. An elongated transfer channel 95 replaces the transfer channel of the first embodiment. The transfer channel 95 is similar to the first embodiment channel but includes a downwardly projecting portion 96 to a discharge opening immediately adjacent to the exposure conveyor belts for guided movement of a dry silver copy paper 97 into the exposure unit 7. The transfer channel 95 is mounted with bolt units as in the first embodiment.

The dry silver developer module 15 may be of any suitable construction but is preferably constructed as more fully disclosed in U.S. Pat. No. 4,322,158. The module 15 is of a rectangular construction essentially identical to that of the magnetic toner brush developer module 15. The second module 15 thus consists of a pair of side plates 98 interconnected to each other with a base plate and interconnecting members to form a rigid, self-supporting module. The dry silver paper developer, as more fully disclosed in the above patent, includes two stages of development defined by roller-heater units 99 and 100 which operate to move the exposed copy paper 97 in one direction in an over and under movement to rapidly develop and produce a hard copy of the image. The module 15 includes an infeed guide 101 aligned with the lower end of the exposure belts and a discharge guide 107 aligned with the discharge chute 18 of the reader/printer apparatus.

Each roller-heater unit 99-100 includes a friction coated roller 103 located within an arcuate recessed portion of a special heater bar 104. The rollers of roller-heater units are simultaneously driven to provide a constant transfer of the copy paper through the module 15. The roller-heater units include special plastic end supports to thermally isolate the units and provide for high speed thermal development of the copy paper. Although such unit is preferred and illustrated, other forms of thermal developing apparatus may of course be used.

Thus, the dry silver module 15 may be plugged into the main frame to provide the desired operation of the reader/printer apparatus with the alternate printing system. The control provides for the necessary operation of the optical system, as well as operation of the several transfer devices. As the modules are self-contained operational units, and the transfer means provide for essentially independent modular operation, the conversion can be made without constructional changes of the other components.

Various modes in carrying out the invention are contemplated as being within the scope of the following claims, particularly pointing out and distinctly claiming the subject matter which is regarded as the invention.

We claim:

1. A reader/printer apparatus comprising an optical image transmitting means, a display means, a photoconductive copy exposure means having a conveyor means, means for selectively coupling said transmitting means to said display means and said exposure means, a supporting main frame for said transmitting means in fixed position relative to said display means and said exposure means and having a hard copy paper outlet, a releasable charger support means located to the infeed side of said exposure means adapted to releasably support an elongated corona charging means having a charging passageway in alignment with said exposure conveyor means, and a developing chamber located to the discharge side of said exposure conveyor means and having an opening for receiving a self-contained developer module, a plurality of said developer modules each having a frame substantially corresponding to said chamber and each being adapted to reliably be mounted within said chamber and each having a paper inlet and a paper discharge aligned with the exposure conveyor means and with said hard copy paper outlet.

2. The apparatus of claim 1 having a control means having a single control element for switching the polarity connection of said corona charging means to a high voltage supply and for controlling the light intensity of said exposure means.

3. The apparatus of claim 1 wherein said developer chamber is a substantially rectangular chamber located to the back lower portion of said main frame, and each of said modules includes a substantially corresponding rectangularly shaped module frame.

4. The apparatus of claim 1 wherein said main frame includes a film support and image projection unit at the lower front portion and a front viewing screen located above said projection unit, said exposure means being located to the back of the main frame generally aligned with said screen, said corona charge support means being located immediately above said exposure means, a paper feed means located in the upper rear portion of the main frame adjacent said support means, and said developer chamber located in the back lower portion of said main frame with a copy inlet aligned with the exposure means and an outlet to the front portion of the main frame.

5. The reader/printer apparatus of claim 4 wherein said developer chamber is open to the back of said main frame for introduction and removal of the developer module.

6. The reader/printer apparatus of claim 1 wherein a display screen is removably mounted to the front of the main frame, an enlarging display mirror movably mounted to the rear portion of the main frame and in front of the exposure means, a small directing mirror movably mounted over the projection unit to direct the image onto the display mirror, a print mirror movably mounted in the upper portion of the main frame in the upward path of the image from the projection unit and means coupled to simultaneously position said mirrors in a first position for screen display and in a second position for exposure of copy paper, said mirrors in said one position being arranged to allow access to the exposure means from the screen opening.

7. The apparatus of claim 6 wherein said display mirror includes a bottom pivot support and is movable between a vertical position and a substantially horizontal position, and said print mirror has an intermediate pivot and is movable between an inclined position extending downwardly toward and in front of the display screen in the print position and being substantially horizontal in the display position.

8. A film reader/printer apparatus having a means for projecting an image of a film carrier for selected viewing of the film image and copying said image comprising,
   an enclosure having a main-frame,
   a display screen secured to said support,
   an exposure unit secured to said main frame,
   an optical projection means for projecting an image from the film carrier onto said display screen and alternatively onto said exposure unit,
   said optical system including a first and second mirror movable for selectively transmitting of the image between the display portion and the exposure unit,
   means to feed a copy sheet into exposure unit,
   a corona charging module support secured to the main frame for releasably receiving a corona charging module and having a copy charging passageway from said supply means to said exposure unit,
   said main frame including a developer chamber located immediately to the discharge side of said exposure unit, at least two developer modules, each of said developer modules being self-contained and having means for conveying the copy paper from the exposure unit through the module and having means for developing of the image on the paper, said one module having a rectangular supporting framework essentially of the configuration of said chamber and including an electrically isolated magnetic toner brush unit for directly depositing of toner particles onto the content areas of exposed photoconductive paper and further including means for fixing of said toner particles on said copy sheet, said one module including means for discharging of said copy sheet from the module, said second developer module essentially of the configuration of the toner brush unit and thereby being adapted to be correspondingly placed within said chamber, said second module including a thermal developing means and having a discharge means and an inlet means aligned with said exposure unit.

9. The apparatus of claim 8 having a guide means for transferring of copy paper from said supply means, a releasable support for said guide means within the housing and being adapted to extend between said supply means and the charge module support and alternatively to extend to said exposure unit.

10. The reader/printer apparatus of claim 8 including high D.C. voltage corona charging conductor means, switch means for connecting said conductor means for either positive charging or negative charging of a photoconductive paper, a pair of electromagnetic switches each including set of contacts secured within a vacuum chamber and connected in series with said conductor means, one of said sets of contacts establishing one polarity output and the other of said sets of contacts establishing a second polarity output.

11. The reader/printer apparatus of claim 10 including a variable potentiometer in series with said conductor means and said contacts to vary the voltage level.

12. The reader/printer apparatus of claim 10 having electromagnetic means to actuate said electromagnetic switches and including a selection switch means having an off position and movable in opposite directions from said off position to actuate said electromagnetic means and having a dead band movement adjacent said off position.

13. The apparatus of claim 12 including a light intensity control means coupled to said selection switch means and operable to the opposite sides of the dead band movement to control the intensity of said optical system.

14. The device of claim 13 wherein said selection switch means has a rotary control means movable from said off position to a first position for actuating said first electromagnetic means and a second position for operating of said second electromagnetic means.

15. The reader/printer apparatus of claim 8 adapted to receive a corona discharge unit comprising a pair of corresponding housing sections adapted to be mounted in opposing spaced relation to define a charging gap therebetween and adapted to have a photoconductive copy paper passed therethrough for charging of the copy paper, and each section including a straight charging wire extending parallel to the gap.

16. The apparatus of claim 15 wherein each of said housing sections is similarly constructed and including a metallic supporting C-channel having side walls, a pair of L-shaped guide rails secured to said walls of said channel and projecting inwardly to partially close the channel and form a longitudinal central opening extending throughout the channel, said charging wire extended longitudinally through said channel and secured at the opposite ends in fixed relation to an insulating support, said one end of said corona wire being interconnected to a high voltage terminal means and the opposite end of said wire being connected to a fixed support means and said channel being grounded in response to mounting of the channel, said wire including a tension spring adjacent the connections to one of said terminal means and said support means.

17. The apparatus of claim 16 wherein said ground terminal includes tension marking means and said high voltage means includes cooperating identifying marking means whereby in installation the wire is pulled into alignment with said tension mark means to create a predetermined tension on said corona wire.

18. A corona charging device particularly adapted for replacable use in a reader/printer apparatus, and comprising a pair of corresponding housing sections adapted to be mounted in opposing spaced relation to define a charging gap therebetween and adapted to have a photoconductive copy paper passed therethrough for charging of the copy paper, each of said housing sections being similarly constructed and including a metallic supporting C-channel having side walls, a pair of L-shaped guide rails secured to said walls of said channel and projecting inwardly to partially close the channel and form a longitudinal central opening extending throughout the channel, a charging wire extended longitudinally through said channel and secured at the opposite ends in fixed relation to an insulating support, said one end of said corona wire being interconnected to a high voltage terminal means.

19. The device of claim 18 wherein said wire includes a tension spring adjacent the connection to one of said terminal means, said wire support including tension marking means and said wire including cooperating identifying marking means whereby in installation the wire is pulled into alignment with said tension mark means to create a predetermined tension on said corona wire.

20. A corona charging device comprising a charging conductor means, switch means for connecting said corona charging conductor means for either positive charging or negative charging of a photoconductive paper, a pair of electromagnetic switches each including set of contacts secured within a vacuum chamber, a power supply means connected in series with said contacts and said charging conductor means, one of said sets of contacts establishing one polarity and the other of said sets of contacts establishing a second polarity on said conductor means, and means to actuate said electromagnetic switches and including selection switch means, having an off position.

21. The device of claim 20 wherein a variable high voltage resistor is connected in series with said contacts to vary the power connection of the conductor means.

22. The device of claim 20 wherein said selection switch has a rotary control rotating from said off position to a first position for actuating said first electromagnetic switch and a second position for operating of said second electromagnetic switch.

23. The corona discharge device of claim 20 including an optical system adapted to illuminate a charged photoconductive paper, and a light intensity control means coupled to said selection switch means and operable to the opposite sides of the dead band movement to control the intensity of said optical system.

* * * * *

UNITED STATES PATENT AND TRADEMARK OFFICE
CERTIFICATE OF CORRECTION

PATENT NO. : 4,494,859
DATED : January 22, 1985
INVENTOR(S) : R. J. Frias, D. Jagielski, and N. R. Schetter It is certified that error appears in the above-identified patent and that said Letters Patent is hereby corrected as shown below:

Col. 1, line 31, After "4,166,691" insert ---which---; Col. 1, line 31, After "4,155,330" insert ---which---; Col. 1, line 32 After "4,288,519" insert ---which---; Col. 4, line 59, Cancel "locatd" and substitute therefor ---located---; Col. 5, line 18, Cancel "descirption" and substitute therefor ---description---; Col. 7, line 63, Cancel "extend" and substitute therefor ---extends---; Col. 7, line 63, Cancel "wyhen" and substitute therefor ---when---; Col. 8, line 1, Cancel "towar" and substitute therefor ---toward---; Col. 8, lines 6-7, Cancel "tendancy" and substitute therefor ---tendency---; Col. 8, line 9, Cancel "uniformily" and substitute therefor ---uniformly---; Col. 9, line 28, Cancel "propell" and substitute therefor ---propel---; Claim 18, col. 14, line 2, Cancel "replacable" and substitute therefor ---replaceable---

Signed and Sealed this

First Day of October 1985

[SEAL]

Attest:

DONALD J. QUIGG

Attesting Officer

Commissioner of Patents and
Trademarks—Designate